United States Patent Office 3,356,452
Patented Dec. 5, 1967

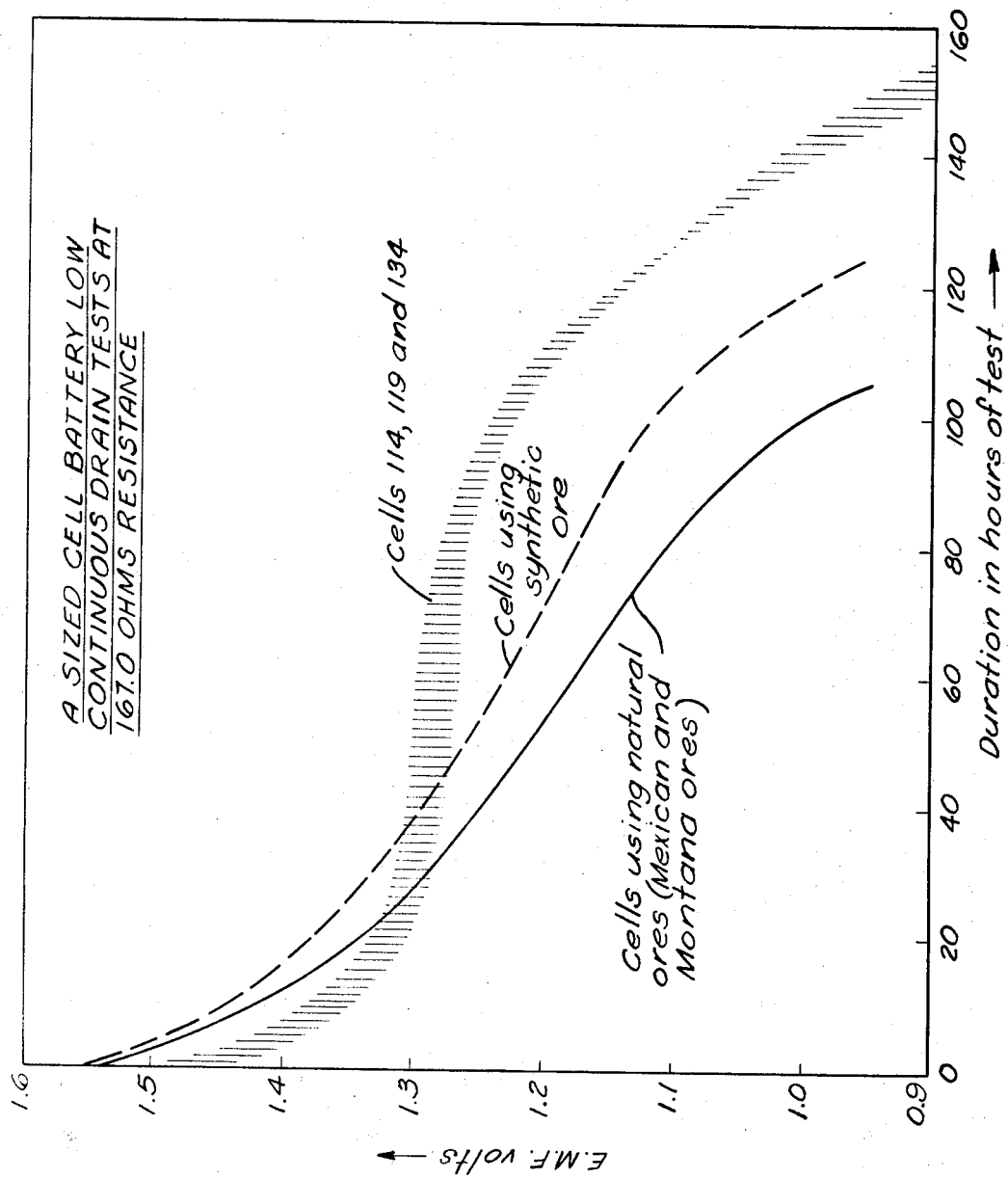

3,356,452
METHOD OF PREPARING MANGANESE DIOXIDE
William G. Moore, Midland, Mich., assignor to The Dow Chemical Company, Midland, Mich., a corporation of Delaware
Filed Aug. 16, 1965, Ser. No. 479,733
4 Claims. (Cl. 23—145)

ABSTRACT OF THE DISCLOSURE

The present invention discloses and concerns a method for preparing a manganese dioxide product which comprises reacting a soluble manganese salt with a soluble metal carbonate at a temperature of at least 55° C. and pH of from 5.7 to 7.2 in the presence of manganese dioxide seed particles, the proportions of reactants being sufficient to provide a continuous molar excess of manganese values over carbonate values thereby precipitating a manganese carbonate product occluded with manganese dioxide, then heat oxidizing the product to produce a manganese dioxide occluded final product. The final product when used as a depolarizer in dry cell batteries is characterized in that it imparts to the cell a surprisingly flat voltage verses discharge time property.

---

Dry cell batteries using conventionally prepared synthetic or natural manganese dioxide depolarizers almost without exception have been found to undergo a continuous decrease in voltage over the effective life of the battery. It is desirable, therefore, to obtain a synthetic manganese dioxide depolarizer which would impart to a dry cell battery a fairly constant voltage level over most of the effective life of the cell, concluded by a rapid decrease in voltage at or near the end thereof.

It is a principal object of the present invention, therefore, to provide a new and improved method for preparing a manganese dioxide product suitable for use as a depolarizer in dry cell batteries. The manganese dioxide product produced by the present novel process when used as a depolarizer in such batteries provides cells which exhibit an essentially flat voltage verses discharge time characteristic to the battery, that is, give to such a battery a fairly constant voltage level over the greater part of the effective life of the battery followed by a substantially abrupt drop in voltage at the end thereof.

These and other objects and advantages of the invention will become more apparent when considered in light of the following description of the invention and the appended figure.

The figure is a graphical presentation of battery test results wherein voltage is plotted against time for A-sized cells prepared using various samples of manganese dioxides ($MnO_2$).

In general, the process of the present invention comprises: reacting a water soluble manganese salt in aqueous solution with a water soluble carbonate in aqueous solution, in the presence of manganese dioxide seed particles hereinafter defined, said salt and said carbonate being reacted together in relative proportions of each to provide and maintain a molar excess of the manganese values in the manganese salt over the carbonate values.

The concentration of the aqueous feed solutions is not critical but is desirably at least about 5 percent by weight and preferably approaching the saturation point of the feed solution at the reaction temperature being employed. It is manifest that manganese salts and carbonates are employed which will not form insoluble or inseparable solid by-product contaminants. The reaction mass is constantly agitated during the reaction period and is maintained at an apparent pH of from about 5.7 to about 7.2. An operable temperature within the range of from about 55° C. to the boiling temperature of the reaction mass is also maintained throughout the reaction. As a result of the foregoing, a slurry of solid manganese carbonate is formed, said manganese carbonate product being occluded with the aforesaid $MnO_2$ seed material. The manganese carbonate so-occluded is thereafter heat oxidized to obtain the desired manganese dioxide product of the present invention. Though the $MnO_2$ product obtained from an initial seeded or unseeded run of the foregoing reaction is preferred for use as the seed material in the present process, any highly porous battery grade manganese dioxide may be employed, preferably having a surface area exceeding about 40 square meters per gram, and more preferably, 50 square meters.

In a preferred embodiment of the present process, metered flows of aqueous solutions of both sodium carbonate ($Na_2CO_3$) and manganese chloride ($MnCl_2$) are admitted into a stirred reactor at a rate to provide more than about one (1) but not significantly over about 1.05 moles of manganese values per mole of carbonate values. A convenient concentration of the carbonate and of the chloride solution is at least about 10 percent by weight. The temperature of the reaction mass is preferably maintained between about 75° C. and 95° C., and at a pH value of from about 6.0 to about 6.9.

Present initially in the reaction mass is the aforesaid porous manganese dioxide seed material, derived preferably from an earlier run of the present process, in an amount of from about 1 to about 700 grams per liter of reaction mass and preferably from about 10 to about 70 grams per liter.

From the foregoing reaction, solid $MnO_2$-occluded manganese carbonate is formed in a liquid phase as a slurry thereof. In practicing the invention the slurry may conveniently be discharged from the reactor by overflow or other removal means while the reaction proceeds under the conditions specified herein to produce more manganese carbonate. The overflowing slurry is collected and the solid manganese carbonate separated from the liquid phase, which, ordinarily is discarded. So-separated, the manganese carbonate having a fairly high bulk density, such as for example 15 grams per cubic inch is then preferably washed with water and heated in the presence of, for example, an excess of oxygen to thereby heat oxidize the carbonate to a manganese dioxide product occluded with said manganese dioxide seed particles as hereinbefore described, herein referred to simply as the "$MnO_2$ product."

Care must be taken to insure during the reaction that a molar excess of manganese values over that of the soluble carbonate of more than one (1) is maintained, as well as a reaction temperature not lower than about 55° C. When these reaction conditions are not observed there is found to be an objectionable amount of $Na_2CO_3$ and/or sodium bicarbonate contaminate occluded with the $MnO_2$ seed in the otherwise substantially pure manganese carbonate intermediate product. Though the present process can be operated at higher temperatures than stated, ordinarily that is not done because of the added apparatus requirements.

The pH limits of the reaction of the present invention may be readily established and maintained since, for example, the $Na_2CO_3$ reactant raises the pH while the $MnCl_2$ reactant lowers it. Accordingly, the pH is easily adjusted by reference to a pH meter by regulating the flow of these feeds into the reactor within the specified molar ratio.

The unique occluded manganese dioxide product obtained by means of the present invention is surprising in that when used as a depolarizer in dry cell batteries it characterizes the battery by exhibiting a remarkably flat voltage verses discharge curve, a property which has heretofore been unable to be obtained in many manganese dioxide depolarizers made in the conventional manner.

In addition to its depolarizing utility, the present occluded $MnO_2$ is useful as an oxidizing agent and as a catalyst in making, for example, hydrocarbon oxidation products.

The following examples serve to illustrate the present invention but are not intended to be construed as limiting the scope of the invention thereto:

*Example I*

To a 22 liter open top Pyrex battery jar as a reactor vessel was added a slurry of 400 grams of $MnO_2$ as seed in 6 liters of water (made in a previous run and comprising 86 percent $MnO_2$ with a density of 8.9 grams per cubic inch, the balance comprising water and lower manganese oxides). The slurry was heated, while actively stirred, to an initial temperature of 68° C. using a conventional hot plate. Two 5 gallon capacity head tanks each connected to rotameters were provided. One of the tanks contained a supply of a 36 gram per liter manganese chloride ($MnCl_2$) solution while the other contained a supply of a 53 gram per liter solution of sodium carbonate ($Na_2CO_3$). To determine the pH of the contents in this reactor, a pH instrument was provided with electrodes placed so that they could be raised or lowered with the level of solution.

The above apparatus being ready, addition of both the $MnCl_2$ solution and $Na_2CO_3$ solution was started and adjusted by rotameter settings such that the pH of the reaction mass was maintained between 6.8 and 7.2. After 2 hours the additions were stopped and the solids in the reaction mass allowed to settle. At this point about 3.2 liters of $Na_2CO_3$ solution and 6.3 liters of $MnCl_2$ solution had been added. The temperature had dropped to 57° C. After 35 minutes settling time from 6 to 8 liters of clear supernatant liquid was removed from the reactor, and the addition started again with the input flows being adjusted to establish and maintain a pH of from 6.6 to 6.8. The reaction was allowed to proceed for 65 minutes, whereupon, it was finally terminated. At this point a total of 11 liters of the $MnCl_2$ solution had been added and 6 liters of the $Na_2CO_3$ solution. The reaction mass was then filtered and the recovered $MnCO_3$ solids washed with 4 gallons of distilled water. After drying in an oven at 105° C. for 16 hours, 652 grams of dry $MnCO_3$ assaying 66.5 percent $MnO_2$ was obtained.

About 620 grams of the dry occluded $MnCO_3$ was air oxidized in a heated stainless steel container as a fluidized bed by passing air at 6.6 liters per minute therethrough, for the following time periods at the indicated temperatures:

After 2 hours—temperature was up to 235° C.
After 4 hours—temperature was up to 355° C.
After 6 hours—temperature was up to 377° C.

The heating was continued overnight and thereafter for 22 hours at 410° C., whereupon, the material was cooled and 576 grams removed from the stainless container assaying 87.5 percent $MnO_2$ (balance being water and lower manganese oxides).

An amount of this $MnO_2$ occluded $MnO_2$ product was used to prepare an A-sized dry cell battery. This cell, designated as No. 114, was tested under the conditions stated hereinafter in the example entitled "Battery Tests" to illustrate the comparatively flat discharge characteristic obtainable in cells employing the manganese dioxide product prepared by the present novel process as a depolarizer.

*Example II*

The procedure of Example I was repeated with the following exceptions: The slurry in the reactor comprised 327 grams of seed $MnO_2$ in an inventory of 6 liters of water (the $MnO_2$ assayed 87.5 percent $MnO_2$ and 61.2 percent Mn). The slurry was heated to 65° C. before the addition of the $MnCl_2$ and $Na_2CO_3$ reactant solutions was started.

The reaction was run initially for 1 hour at a pH of 6.9 to 7.0, adjusted by regulating the flows of the reactants by means of the rotameters. At the end of the hour period 6.7 liters of the $MnCl_2$ solution and 3.6 liters of the $Na_2CO_3$ solution had been added. 8 liters of liquid phase in the reactor was removed by filtration, whereupon, the addition of reactants was continued at essentially the same pH and temperature for an additional 25 minutes. At termination of the 25 minute reaction period following a total of 10 liters of the $MnCl_2$ solution added and a total of 5.2 liters of the $Na_2CO_3$ solution. The $MnCO_3$ precipitate product was recovered by filtration, washed, then dried as in Example I, thereby obtaining 568 grams assaying 55.4 percent $MnO_2$.

550 grams of the dried $MnCO_3$ was air oxidized as in Example I to obtain 484 grams of occluded $MnO_2$ product assaying 86.5 percent $MnO_2$.

An amount of the oxidized material was used as a depolarizing agent in preparing an A-sized dry cell battery. This cell, designated as No. 119, was tested and the results recorded in the example hereinafter entitled "Battery Tests" showing that this material imparted to the cell a comparative flat discharge characteristic.

*Example III*

The procedure of Example I was again repeated except that 250 grams of the oxidized $MnO_2$ product from Example II was used as seed material herein by slurrying same in 6 liters of water and placing in the reactor for addition there into of the $MnCl_2$ and $Na_2CO_3$ reactants. The reactants were of the same concentration as in Example I and II, except the $MnCl_2$ solution concentration was 50 grams per liter. The initial temperature of the reaction mass was 61° C., dropping off over a total 50 minute reaction period to 52° C. at the end thereof, whereupon, 6.2 liters of the $MnCl_2$ solution had been added and 5.0 liters of the $Na_2CO_3$ solution. The $MnO_2$-occluded $MnCO_3$ precipitate was recovered by filtration, then washed with 2 gallons of water and dried at 135° C. for 16 hours. The $MnCO_3$ assayed 49.0 percent $MnO_2$. 469 grams thereof was air oxidized for 22 hours as in Example I plus seven (7) more hours at 410–420° C. 350 grams of oxidized $MnO_2$ occluded $MnO_2$ product was obtained, assaying 86.3 percent $MnO_2$. A portion of this oxidized product was used as a depolarizer in preparing an A-sized dry cell battery, numbered 134, which was tested with the results of the test being recorded in the example following hereinafter entitled "Battery Tests." Thus, material, as will be discussed hereinafter, imparted to the cell a surprisingly flat discharge characteristic.

*Example IV—Battery Tests*

The A-sized cells prepared using as depolarizers the $MnO_2$ product of Examples I through III were, as aforesaid, tested to determined their voltage-verses-discharging time characteristic. The tests were carried out by subjecting each cell to a continuous low drain at about 167 ohms for the indicated time in hours as shown in the drawing. The voltage at various times were recorded and plotted to provide the shaded curve as shown.

These test cell data were compared with data obtained from similarly testing A-sized cells prepared employing $MnO_2$ depolarizing material obtained from various commercial natural Mexican and Montana manganese dioxide ores pyrolusite currently used by the battery industry as a source of $MnO_2$ and a sample of synthetic ores.

The data in the drawing shows that the test cells using the present occluded $MnO_2$ material as a depolarizer are characterized by a surprisingly constant discharge level, whereas, the cells employing the conventional natural and synthetic ore products (not occluded) exhibited a continually decreasing voltage level over a much shorter effective cell life. Clearly then, the occluded $MnO_2$ prepared by the novel method of the present invention imparts to a dry cell battery a surprisingly flat voltage-verses-discharge time characteristic over most of its effective life, with a fairly abrupt drop in voltage near the end thereof.

Other variations of reaction time, temperature, pH and reactant concentration may also be employed in accordance with the present invention to prepare the $MnO_2$ product of the present invention.

The present invention may be modified and changed without departing from the spirit or scope thereof and it is understood that the present invention is only limited as defined in the appended claims.

I claim:

1. A method for preparing a manganese dioxide product which comprises: (a) reacting at a temperature of at least about 55° C., and at an apparent pH from about 5.7 to about 7.2, a soluble manganese salt with a soluble metal carbonate, in an agitated aqueous liquid inventory containing from about 1 to about 700 grams per liter of seed particles of manganese dioxide, the relative proportions of reactants in the reaction mass being such to provide a continuous molar excess of manganese values over carbonate values, thereby forming a precipitate of solid manganese carbonate occluded with said manganese dioxide seed particles; (b) separating said precipitate from the reaction mass, and (c) heat oxidizing the manganese carbonate so-separated to produce manganese dioxide occluded with said seed particles.

2. The method of claim 1, wherein the seed particles in the inventory liquid are in a concentration of from about 10 to about 70 grams per liter, the temperature is from about 75° C. to about 95° C., the apparent pH is from about 6.0 to about 6.9, the molar excess is more than one but not greater than about 1.05, the separated precipitate is washed with water, and wherein the precipitate so-separated and washed is heat oxidized in the presence of an excess of oxygen.

3. The method of claim 1, wherein the seed is a manganese dioxide characterized by a surface area exceeding about 40 square meters per gram.

4. The method of claim 2, wherein the seed is a manganese dioxide characterized by a surface area exceeding about 50 square meters per gram.

References Cited

UNITED STATES PATENTS

| | | | |
|---|---|---|---|
| 2,757,071 | 7/1956 | Welsh et al. | 136—139 |
| 2,956,860 | 10/1960 | Welsh | 136—139 |

WINSTON A. DOUGLAS, *Primary Examiner.*

C. F. LEFEVOUR, *Assistant Examiner.*